May 25, 1926.

J. H. ZANATH

ILLUSION DEVICE

Filed Dec. 5, 1925

1,586,137

Inventor
John H. Zanath

Patented May 25, 1926.

1,586,137

UNITED STATES PATENT OFFICE.

JOHN H. ZANATH, OF WOODLAWN, PENNSYLVANIA.

ILLUSION DEVICE.

Application filed December 5, 1925. Serial No. 73,323.

My invention relates to an illusion device to be utilized as a holder for stick candy, advertising novelty or amusement device.

An object of the invention is to provide a device which in operation will appear mysterious, so as to excite the curiosity of children and afford them entertainment and amusement.

Another object of the invention is to provide a device of the above-character which is simple to operate and inexpensive to manufacture.

Other objects and advantages of the invention will be apparent during the course of the following description.

Figure 1:
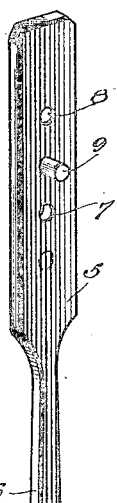
Figure 2:
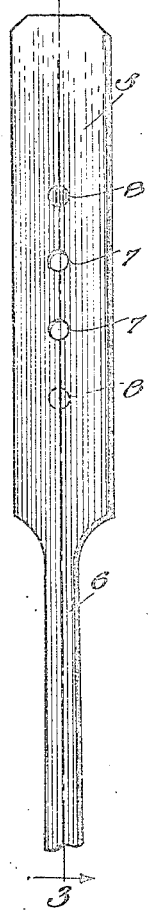
Figure 3:
Figure 4:
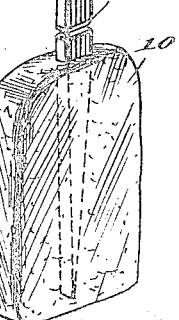
Figure 4:
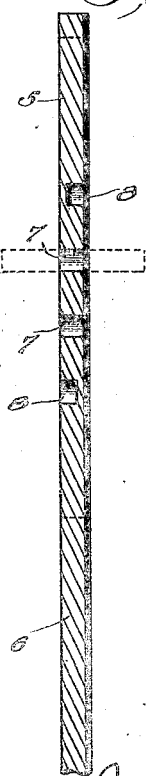
Figure 5:

In the accompanying drawing forming a part of this specification and in which like numerals are employed to designate like parts throughout the same, Figure 1, is a perspective view of the device with a piece of candy attached thereto, Figure 2, is a view of one side of the device, Figure 3, is a view of the opposite side, Figure 4, is a longitudinal sectional view on line 3—3 of Figure 2, and, Figure 5, is a perspective view of the peg.

Referring to the drawing, wherein for the purpose of illustration I have shown a preferred embodiment of my invention, the numeral 5 denotes the body of the device which is preferably a relatively narrow flat stick having a reduced extension at one end forming a handle or stem 6. A pair of spaced apertures 7 are arranged longitudinally of the center of the body and extend therethrough. A blank opening 8 is formed in each side of the body, at opposite ends of the apertures 7, being positioned in spaced relation thereto. The blank openings are in alinement with the apertures and of the same diameter to give the appearance of three apertures when looking from either side of the body. A short peg 9 is adapted to be inserted in either of the apertures 7 and when viewed from one side of the body will appear to be in the center of the openings and when viewed from the opposite side to be in the end opening.

The free end of the stem is tapered and has a piece of candy 10 mounted thereon. Adjacent the lower end of the stem a groove 11 surrounds the stem, so when the candy has been eaten the stem may be broken off and the device used for amusement.

In use, the operator holds the stem of the device between his fingers and places the peg in one of the apertures. Holding one side of the device to the view of the audience, he asks them to observe the hole in which the peg is placed. He then places a covering over the device and by a slight twist of the fingers turns the device over and upon removal of the cover it will appear to the audience that the peg has changed holes. While the device as shown is used as a holder for stick candy, it will be seen that the same may be used separately as an advertising novelty or toy.

It is to be understood that the form of my invention herewith shown and described is to be taken as a preferred example of the same, and that certain changes in the shape, size and arrangement of parts may be resorted to without departing from the spirit of the invention or the scope of the subjoined claims.

Having thus described my invention, I claim:

1. A device of the character described comprising a body having a series of openings therethrough and a blank opening on opposite sides of said body in alinement with said series of openings, and a peg adapted to be inserted in one of said openings.

2. A device of the character described comprising a body having a series of openings therethrough and a blank opening spaced from each end of said openings on opposite sides of the body and a peg adapted to be inserted in one of said openings.

3. A device of the character described comprising a flat body having a series of openings therethrough and a blank opening spaced from each end opening on opposite sides of said body and a peg adapted to be inserted in one of said openings.

4. A device of the character described comprising a flat body having a reduced extension forming a stem, said body having a series of alined openings and a blank opening on opposite sides of the body and spaced from the end openings and a peg adapted to be inserted in said openings.

5. A device of the character described comprising a body having a series of openings, the end openings being closed on opposite sides of the body and a peg adapted to be inserted in the intermediate openings.

6. A device of the character described comprising a flat body having a reduced extension forming a stem, said body having series of alined openings, the end openings being closed on opposite sides of the body and a peg adapted to be inserted in the intermediate openings.

In testimony whereof I affix my signature.

JOHN H. ZANATH.